United States Patent
Lebrun

[11] Patent Number: 5,459,603
[45] Date of Patent: Oct. 17, 1995

[54] OPTICAL SIGHT LASER DEVICE FOR BURST FIRING

[75] Inventor: Luc Lebrun, Verrieres le Buisson, France

[73] Assignee: Aerospatiale Societe Nationale Industrielle, Paris, France

[21] Appl. No.: 126,711

[22] Filed: Sep. 27, 1993

[30] Foreign Application Priority Data

Sep. 28, 1992 [FR] France .................................. 92 11525

[51] Int. Cl.[6] .................................................. G02B 26/02
[52] U.S. Cl. ........................ 359/235; 359/234; 359/230; 33/241; 362/113
[58] Field of Search ...................... 359/227, 234, 359/235, 230; 33/233, 241, 245; 250/216, 232, 233, 201.1; 362/110, 113

[56] References Cited

U.S. PATENT DOCUMENTS

| 4,684,796 | 8/1987 | Johnson ................................... 250/201 |
| 5,052,801 | 10/1991 | Downes, Jr. et al. .................. 356/153 |

FOREIGN PATENT DOCUMENTS 1132742   7/1962   Germany.
3234289   3/1984   Germany.

OTHER PUBLICATIONS

Patent Abstracts of Japan, vol. 10, No. 76, P–440 (2133), (Mar. 1986).

Primary Examiner—Paul M. Dzierzynski
Assistant Examiner—James Phan
Attorney, Agent, or Firm—Fisher, Christen & Sabol

[57] ABSTRACT

An optical sight laser device having:

a laser source (4) capable of emitting a laser beam (6);

an optical sight system (1), through which a sight beam (9) passes, intended to allow an operator to direct the laser beam toward a target;

a control device (11) capable of triggering the laser source (4) with a view to firing, initiated by an actuating member (5), at the disposal of the operator; and a movable element (12) capable of occulting the sight beam (9) during laser firing, wherein the movable element (12) is capable of also occulting the laser beam (6) and it occults alternately the laser beam (6) and the sight beam (9) at a frequency such that the operator's retinal persistence is maintained.

13 Claims, 4 Drawing Sheets

OPTICAL SIGHT LASER DEVICE FOR BURST FIRING

The present invention relates to optical sight laser devices ensuring protection of the eyes of the operators using these devices.

Many laser devices, for example laser weapons, telemeters, surgical apparatuses, etc., are known to include a sight system enabling an operator to direct the laser beam in a precise direction.

Such devices can be extremely dangerous for the eyes of the operator, given that the light emitted by the laser can be sent back in the direction of the sight system after having been reflected by an object lying in the path of the beam.

This danger is all the greater as the energy of the laser source increases and as the operator uses a sight system equipped with an optical unit whose purpose is to collect a quantity of energy greater than can the naked eye.

In a known manner, it is possible to avoid this danger by using a shutter capable of occulting the sight from the operator during laser firing.

Such a known device has the disadvantage of interrupting the sight at each firing. Thus, in the case where the operator wishes to carry out several consecutive laser firings, he cannot verify whether the beam remains pointed in the correct direction between two firings, a slight deviation in the positioning of the laser device being able to alter the direction of the beam between the firings. This consequently requires, on the part of the operator, a new sighting after each laser firing. It is then virtually impossible to carry out burst firing accurately.

The object of the present invention is to improve such a known shutter device while at the same time allowing continuous sighting and protecting the operator's eye. It is particularly advantageous for devices intended for burst firing.

To this end, according to the invention, the laser device including:

a laser source capable of emitting a laser beam;

an optical sight system, through which a sight beam passes, intended to allow an operator to direct said laser beam toward a target;

a control device capable of triggering said laser source with a view to firing, initiated by an actuating member, at the disposal of said operator; and a movable element capable of occulting said sight beam during laser firing; said movable element is capable of also occulting said laser beam and occults alternately said laser beam and said sight beam at a frequency such that said operator's retinal persistence is maintained.

Thus, when the passage of the laser beam in the direction of a target is possible, the sight is occulted and vice versa. Therefore any risk of the operator's eye being in contact with the laser beam is avoided. It is therefore well protected. Furthermore, since sighting is possible at regular time intervals which are very close to each other, so as to maintain the operator's retinal persistence, the operator has the impression of seeing the target continuously. There is therefore a double advantage: on the one hand, the eye is protected and, on the other hand, sighting is continuous and allows burst laser firing.

To determine, in a precise manner, the occulting frequency of the sight beam and of the laser beam, it is advantageous for the movable element to be a rotary body allowing the passage of each of the two beams, in an alternate manner, only once per rotation cycle. Consequently, it is possible to determine, very precisely, as a function of the speed of rotation of the rotary body, the number of sight beams perceived by the eye during a defined duration. This number is chosen in such a way that the retinal persistence of the operator is maintained. It has been found that a speed of rotation greater than 25 rev/s allows such a result to be obtained.

Moreover, said laser device includes, advantageously, synchronization means triggered by a safety member which can be actuated by the operator and allowing said operator to trigger the laser source only when the movable element does not occult the laser beam. Firings which would occur while said movable element was occulting the laser beam are thus prevented. Risks of damage which such a laser beam could cause inside the device, since the energy contained in such a beam is generally very high, are avoided. At the very least, unnecessary heating of the device is avoided. Said synchronization means, whose action varies as a function of the occultation of the laser beam, are, advantageously, sensitive to the rotation of the movable element which is responsible for this occultation. Consequently, the safety member triggering said synchronization means can serve to trigger the rotation of said movable element.

Furthermore, the invention provides, advantageously, a link, for example a mechanical link, between the safety member triggering the synchronization means and the actuating member triggering the laser source.

This link allows actuation of the triggering member and, consequently, the laser firing, only when the safety member is actuated.

The previous characteristic has two advantages:

on the one hand, it authorizes the laser emission only when the synchronization means and the movable element are actuated; put another way, the laser emission is possible only when these safety means, whose advantages were mentioned previously, are activated;

on the other hand, a double manipulation by the operator is required to trigger the laser: firstly, he has to actuate the safety member and then actuate the triggering member; inadvertent triggering of the laser device, following an ill-timed actuation of the member for triggering the laser source, is thus prevented.

According to one embodiment applied to a weapon of the laser rifle type, the safety member is a sight contact and the actuating member is a trigger. The sight contact is actuated by pressure of the operator's head, when he gets into a sighting position, for example by means of his cheek or his chin; various situations may be envisaged depending on the embodiment. This thus avoids the operator having to move too much which could disturb the aim.

Moreover, it may be advantageous to assemble into a single component the various elements of the device in accordance with the invention, it being possible for said component, for example, to be supported by a block, for example made of light alloy machined as a single piece. This makes it possible to have a device which can be easily transported and, for example, impact resistant if the block which supports the component is made of a suitable material.

The figures of the appended drawing will make it easy to understand how the invention can be realized. In these figures, identical references designate similar elements.

Figure 1:
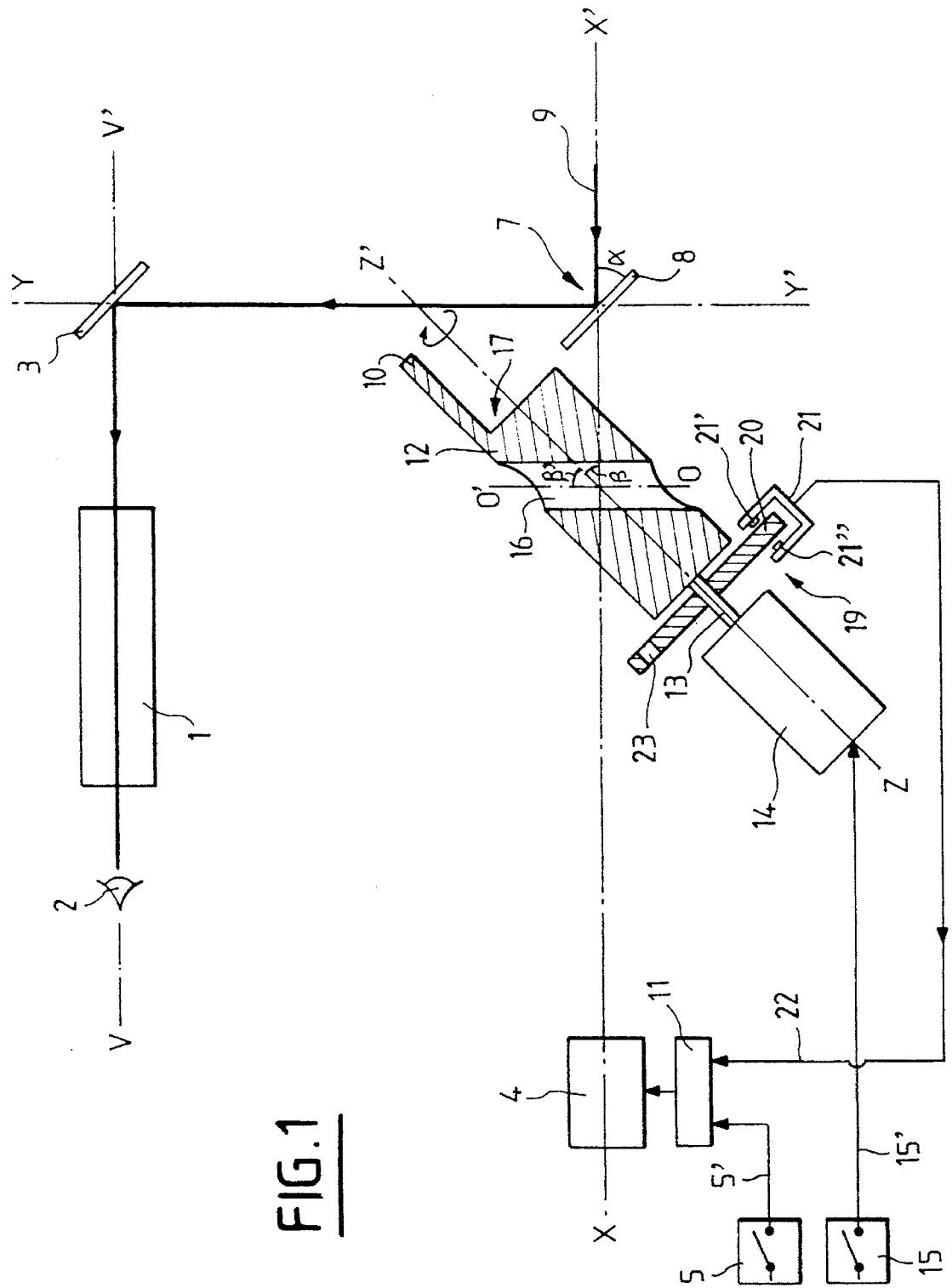
FIG. 1 is a diagrammatic view of an embodiment of the device in accordance with the present invention, in its position in which the laser beam is occulted and the sight is disengaged.
Figure 2:
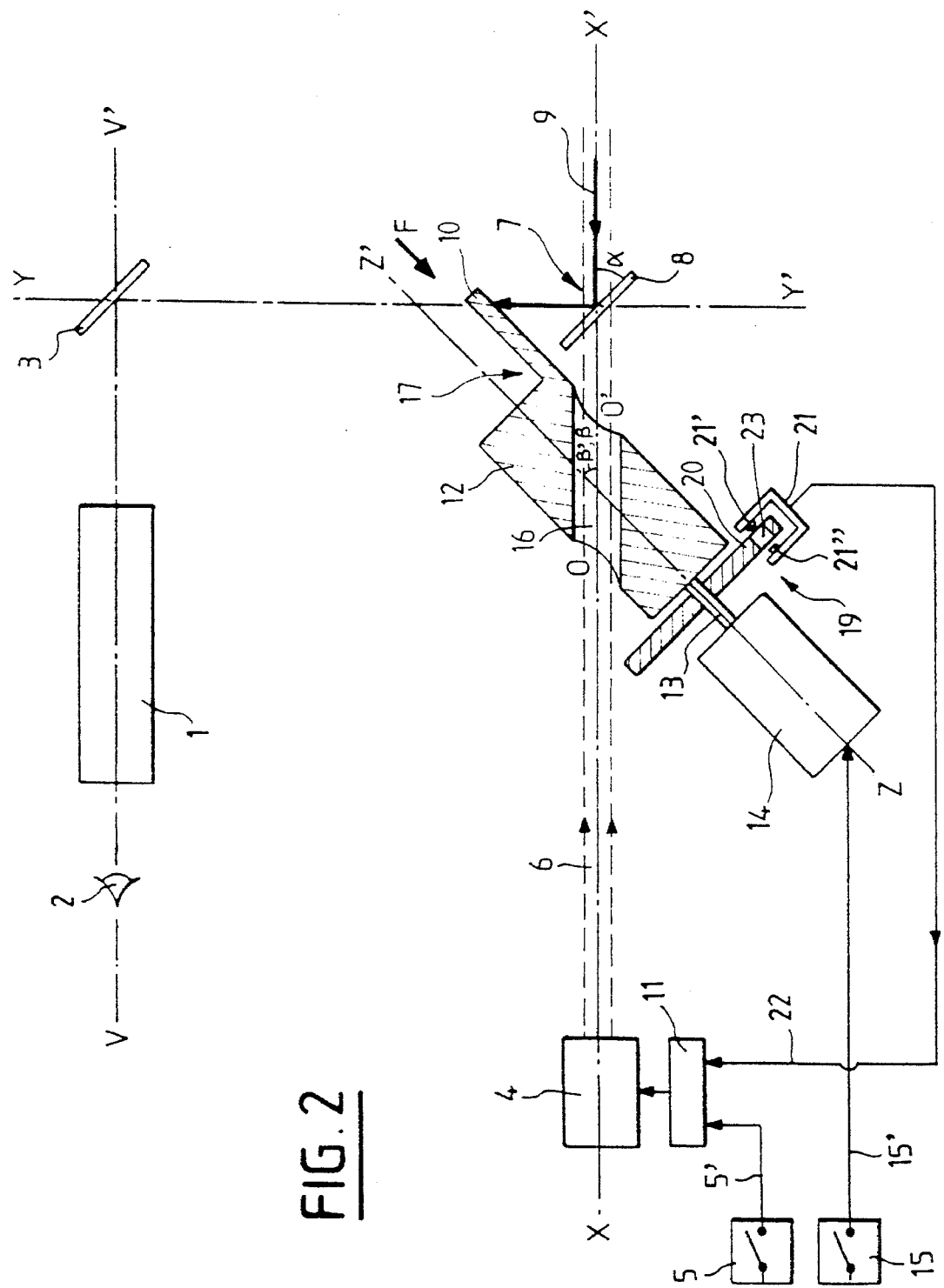
FIG. 2 shows diagrammatically the device of FIG. 1, in its position in which the sight beam is occulted and the laser beam can pass.

The optical sight laser device, in accordance with the present invention and shown in FIGS. 1 and 2, includes an optical sight system 1, of the aiming-sight type, of optical axis V—V'. An eye 2 of an operator using said device can be placed on the optical axis V—V', behind said sight system 1.

Said optical sight laser device also includes a laser source 4 triggered by a control device 11 initiated by an actuating member 5 and capable of emitting, toward a target (not shown), a laser beam 6 of axis X—X' (see FIG. 2).

A semi-transparent mirror 8, allowing said laser beam 6 to pass, is placed on the axis X—X'. Said semi-transparent mirror 8 makes an angle α with the axis X—X' so as to send back, along the axis Y—Y', an optical sight beam 9 of axis X—X', coming from the target. Said semi-transparent mirror 8 lies at the point of intersection 7 of the axes X—X' and Y—Y'. A stationary mirror 3 is placed on the axis Y—Y' so as to send said sight beam 9 of axis Y—Y' back along the axis V—V' into the sight system 1 through which it is directed to the operator's eye 2.

Moreover, said optical sight laser device includes a movable element 12 placed in the vicinity of the point of intersection 7. Said movable element 12 is capable of occulting the sight beam 9 by cutting the axis Y—Y', between the stationary mirror 3 and the semi-transparent mirror 8, in the vicinity of said point of intersection 7.

Furthermore, said movable element 12 is capable of occulting the laser beam 6 by cutting the axis X—X', between the laser source 4 and the semi-transparent mirror 8, in the vicinity of the point of intersection 7.

Said movable element 12, the laser beam 4, the sight system 1, the stationary mirror 3 and the semi-transparent mirror 8 are mechanically held fast.

Figure 3:
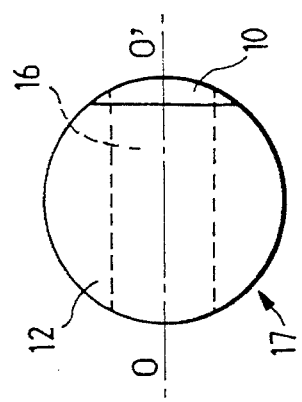
FIG. 3 is a view, in the direction F of FIG. 2, of the movable element.

As FIGS. 2 and 3 show, said movable element 12 is a cylindrical body mounted coaxially on a shaft 13 and driven in a rotary movement by a motor 14, preferably an electric motor.

Said electric motor 14 is triggered by a contact 15, actuatable by an operator using this device, which, as will be seen below, serves as a safety member.

The axis of rotation Z—Z' of said movable element 12 makes an angle β with the axis X—X'. Advantageously, said angles α and β are both equal to 45°.

Said movable element 12 has a through-orifice 16 of diameter slightly greater than the diameter of the laser beam 6, and of axis O—O'. The axis O—O' makes an angle β', having the same value as the angle β, with the axis of rotation Z—Z' of the movable element so that, in the position shown in FIG. 2, the axis O—O' is coincident with the axis X—X'.

Said rotary body has, at its free end, a cut-out part 17 leaving behind a projecting blade 10, off-centre in relation to the axis of rotation Z—Z' and parallel to said axis of rotation Z—Z', allowing the sight beam to pass when the movable element lies in the position shown in FIG. 1.

On each rotation cycle, the through-orifice 16 lies once coaxial with the axis X—X' and opposite the laser source 4, as shown in FIG. 2, thus allowing the laser beam 6 to pass in the direction of the target. In this position, the blade 10 cuts the axis Y—Y', occulting the beams of the same axis. No beam, and in particular the laser beam reflected by the target, can then reach the operator's eye 2 which is, consequently, protected from these harmful rays.

As it rotates, the movable element 12 moves away from the position shown in FIG. 2 in the direction of the position shown in FIG. 1.

When it reaches the latter position, said blade 10, which projects at the free end of said movable element 12, no longer lies on the axis Y—Y', thus allowing the sight beam 9 reflected by the semi-transparent mirror 8 to reach the stationary mirror 3 and to render sighting possible. As regards the laser beam 6, if it were emitted, it would be occulted given that the through-orifice 16 is no longer coaxial with the axis X—X' and no longer lies opposite the laser source 4. However, as will be seen hereinbelow, in such a position laser emission is rendered impossible.

While it is rotating, the movable element 12 therefore occults alternately the laser beam 6 and the sight beam 9.

The rotation is performed at a speed such that successive sight beams reaching the eye ensure the operator's retinal persistence. Advantageously, said movable element 12 rotates at a speed greater than 25 rev/s.

Means 19 for synchronizing the laser emission, constituted for example by a disk 20 and by an optoelectronic detector 21, are connected via a link 22 to the control device 11.

Said control device 11 triggers the laser emission, as will be seen below, if two conditions are met: the actuating member 5 must have given the triggering command via the link 5' and the synchronization means 19 must have confirmed this command via the link 22. Said confirmation of the triggering command arises from the activation of the optoelectronic detector 21.

Said optoelectronic detector 21 is a stationary body which includes two arms, one of which is equipped with a light emitter 21' and the other is equipped with a receiver 21" located opposite said emitter.

The disk 20, which is fastened to the shaft 13 between the motor 14 and the movable element 12, rotates at the speed of the latter between the arms of the optoelectronic detector 21, thus cutting the light beam.

Said disk 20 includes a hole 23 located so as to lie, while the disk is rotating and once per rotation cycle, opposite the light emitter 21' and the receiver 21", allowing the light to pass. The receiver 21" then detects the light beam emitted by the emitter 21' and the detector 21 is activated.

The various elements are located so that the hole 23 lies between the arms of the detector 21, opposite the light emitter 21' and the light receiver 21", when the through-orifice 16 is coaxial with the axis X—X'. In other words, the optoelectronic detector 21 is activated only when the passage within the movable element 12 is clear for the laser beam 6.

Figure 4:
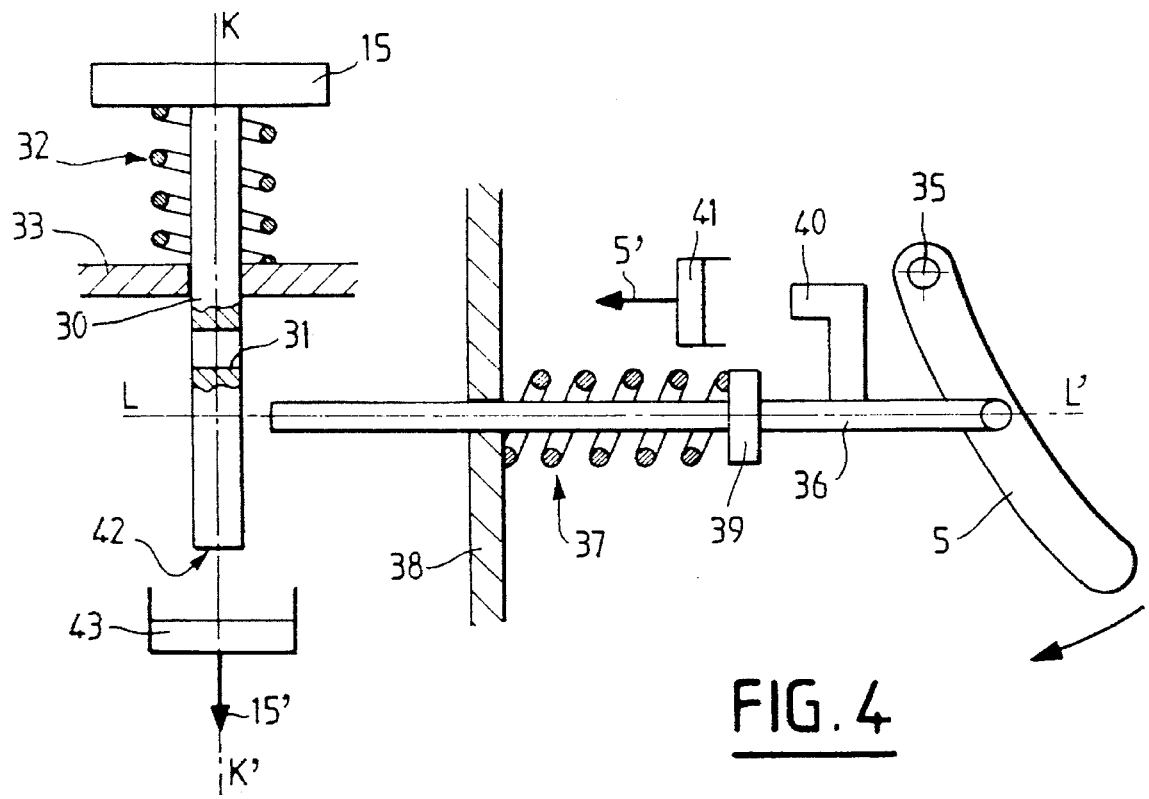
FIG. 4 shows a mechanical link between a trigger and a sight contact in the rest position.
Figure 5:
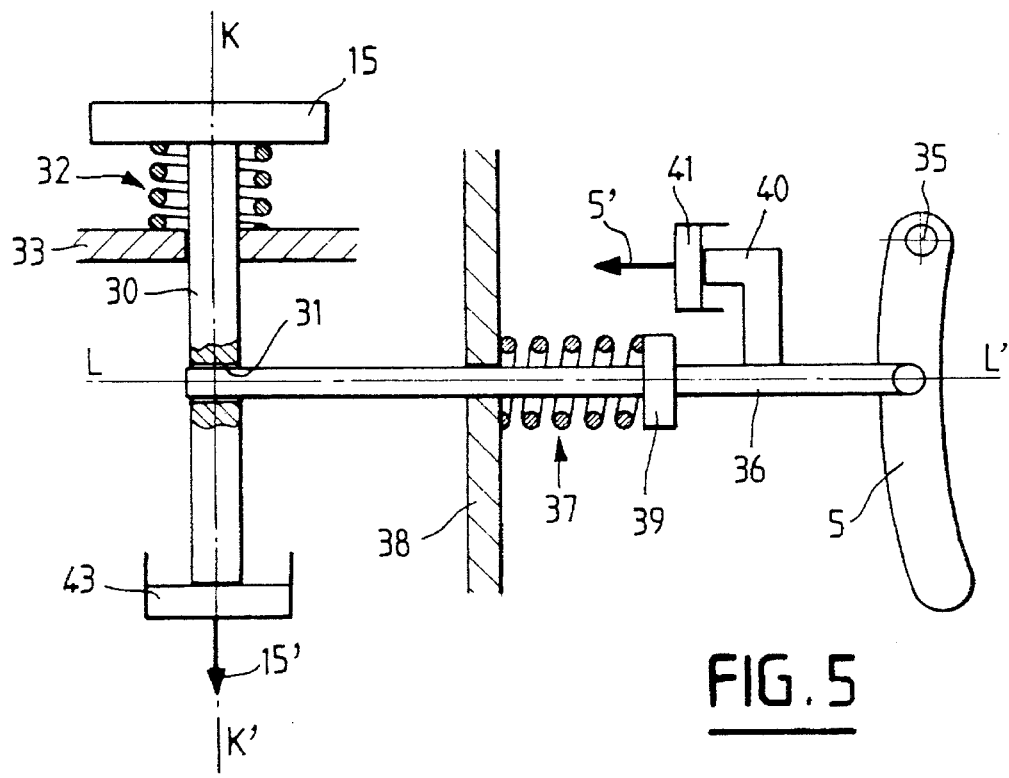
FIG. 5 shows the same mechanical link as in FIG. 4, but in the working position.

FIGS. 4 and 5 show a mechanical link connecting the actuating member which triggers the laser source, constituted by a trigger 5, to the safety member triggering the synchronization means constituted by a sight contact 15.

In FIG. 4, said members are not actuated: they lie in their rest positions. On the other hand, in FIG. 5, they are actuated and therefore lie in their working positions.

The sight contact 15 is equipped with a central rod 30, of axis K—K', which includes an orifice 31 transverse to said axis K—K'. Said sight contact 15, capable of moving along the axis K—K', is held in its rest position by a system of springs 32 bearing on a stationary support 33, for example the stock of a rifle, and pushing back said sight contact 15 outward.

Upon exerting pressure on the sight contact, the latter moves along the axis K—K'. It lies in its working position when the end 42 of the central rod 30 reaches an optoelectronic detector 43 and activates said detector.

The activation of the optoelectronic detector 43 leads to the triggering of the synchronization means 19 through the link 15'.

The trigger 5 is capable of being subjected to a circular movement about a pin 35 by pressure of a finger of the operator. The trigger is connected to a rod 36, of axis L—L' transverse to the axis K—K', and is capable of moving along said axis L—L'. A system of springs 37, which is placed between a stationary support 38 and a bearing element 39 arranged on the rod 36, pushes back said rod 36 along the axis L—L', in the direction of the trigger 5, and thereby sets the trigger 5 into its rest position.

When the sight contact 15 lies in its working position, such as shown in FIG. 5, the orifice 31 lies opposite the rod 36.

By exerting a pressure on the trigger 5, in such a position of the sight contact 15, the rod 36 moves along the axis L—L' through the orifice 31. This then allows an arm 40 arranged on the rod 36 to reach an optoelectronic detector 41 in order to activate it.

The activation of the optoelectronic detector 41 leads to the command, for triggering the laser source, given to the control device 11 via the link 5'.

As long as the sight contact 15 does not lie in its working position, such an activation is impossible because the orifice 31 does not lie opposite the rod 36, so that the end of said rod 36 rests against the central rod 30 of the sight contact 15. The movement along the axis L—L' is then insufficient to allow the arm 40 to reach the optoelectronic detector 41.

To be able to activate the two optoelectronic detectors 43 and 41, it is consequently necessary firstly to exert a pressure on the sight contact 15 in order, on the one hand, to activate the detector 43 and, on the other hand, to place the orifice 31 opposite the rod 36. Next, it is necessary to exert a pressure on the trigger 5 to move the rod 36 until the arm 40 reaches the detector 41.

Figure 6:
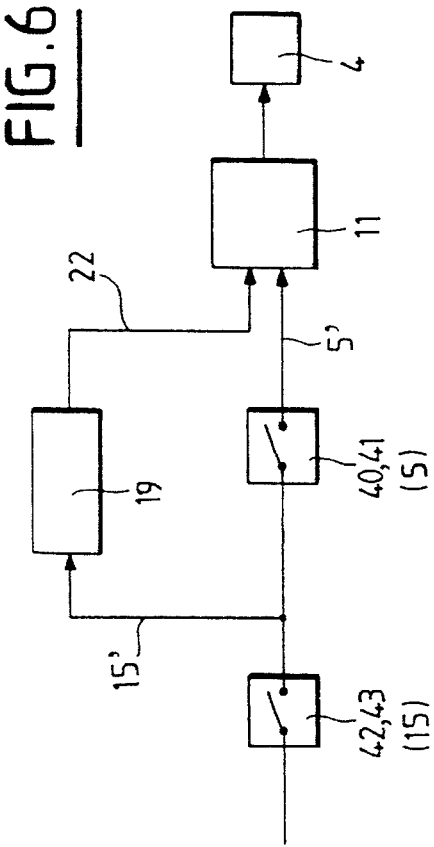
FIG. 6 is a diagram showing the connections between the member for triggering the laser source and the various safety means.

FIG. 6 is a diagram showing the relationships between the member 5 for triggering the laser source and the various safety means during laser firing.

When the operator gets into the sighting position, he actuates the safety member 15, for example the sight contact in the case of a laser rifle, which, on the one hand, activates the optoelectronic detector 43, thus triggering the synchronization means 19 through the link 15' and, on the other hand, renders the actuation of the triggering member 5 possible through the mechanical link which connects the two members.

When the operator has carried out his sighting and when he decides to trigger the laser firing, he actuates the triggering member 5, which activates the optoelectronic detector 41, giving the triggering command to the control device 11 via the link 5'. However, the control device 11 triggers the laser firing only when the optoelectronic detector 21 of the synchronization means 19 is activated and when the triggering confirmation is transmitted to said control device 11 via the link 22.

Figure 7:
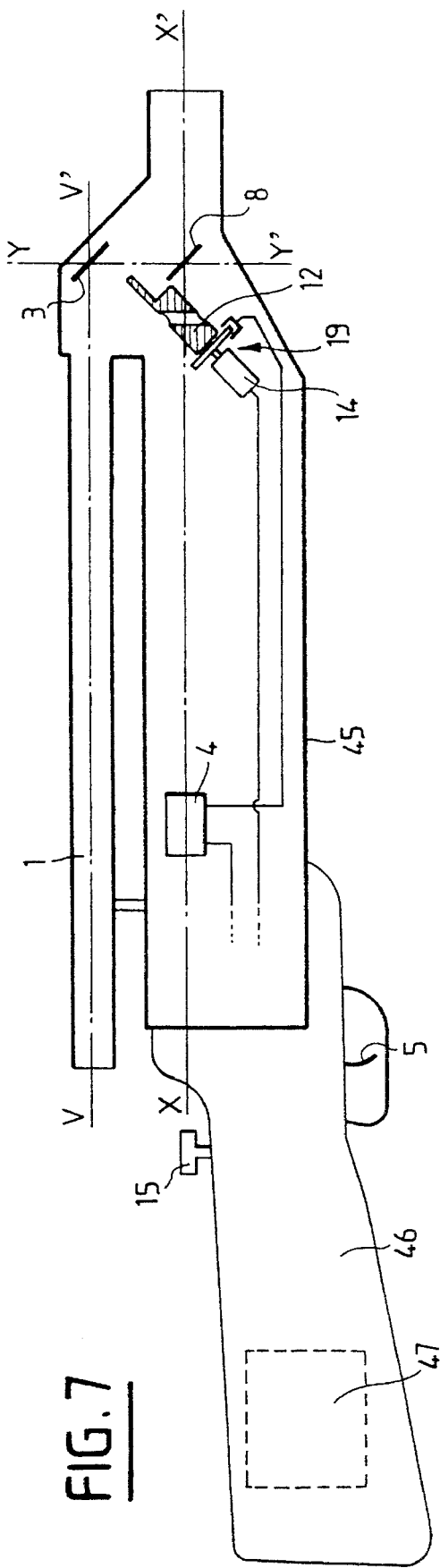
FIG. 7 illustrates an application of the device in accordance with the present invention.

In the embodiment of FIG. 7, the sight device 1, the movable element 12 with its motor 14, the synchronization means 19, the laser source 4, the stationary mirror 3 and the semi-transparent mirror 8 are assembled within the same component 45 which, for example, can be supported by a block made of light alloy machined as a single piece.

The device according to the invention can be applied to a weapon of the rifle type comprising, in addition to the component 45, a stock 46 and a laser output optical device (not shown). According to the embodiment of FIG. 7, the trigger 5 and the sight contact 15 are mounted on the stock 46 which also includes a system 47 for supplying the laser device.

Said supply system 47 is constituted by batteries which are, depending on the embodiment, either placed directly inside the stock or are located in a case which is connected to the stock of the weapon and is capable, for example, of being carried by the user of the device, by means of a backpack.

Claims:

1. An optical sight laser device comprising:

a laser source which an emit a laser beam capable of being directed toward a target;

an optical sight system, through which a sight beam passes, intended to allow an operator to see said target;

a control means for triggering said laser source in order to first said laser beam to emit said laser beam, initiated by an actuating member, controllable by said operator; and a movable means for occulting said sight beam during laser firing;

wherein said movable means occults said laser beam and occults alternately said laser beam and said sight beam at a frequency such that the retinal persistence of said operator is maintained.

2. The optical sight laser device as claimed in claim 1, wherein said movable means is placed in the vicinity of the point of intersection of said laser beam and said sight beam.

3. The optical sight laser device as claimed in claim 2, wherein said movable means, occulting alternately said laser beam and said sight beam, is a rotary body.

4. The optical sight laser device as claimed in claim 3, wherein said rotary body has a through-orifice intended for said laser beam to pass and wherein said through-orifice lies coaxial with said laser beam and opposite said laser source once per rotation cycle of said rotary body.

5. The optical sight laser device as claimed in claim 1, wherein said device includes synchronization means triggered by a safety member actuatable by the operator, allowing said operator to trigger said laser source only when said movable means does not occult said laser beam.

6. The optical sight laser device as claimed in claim 5, wherein said synchronization means are constituted by a stationary optoelectronic detector, which includes a light emitter and a light receiver placed opposite said emitter, and by a disk, rotating at the speed of rotation of said rotary body between said emitter and said receiver, having a hole located so as to lie, once per rotation cycle, opposite said light emitter and to allow the light beam emitted by said emitter to pass toward the light receiver.

7. The optical sight laser device as claimed in claim 6, wherein the speed of rotation of said rotary body and of said synchronization means is greater than 25 rev/s.

8. The optical sight laser device as claimed in claim 5, wherein a link is provided between said safety member triggering said synchronization means and said actuating member triggering said laser source and wherein said link allows actuation of said actuating member only when said safety member is actuated.

9. The optical sight laser device as claimed in claim 8, wherein said safety member is constituted by a sight contact and said actuating member by a trigger and wherein said link is a mechanical link.

10. The optical sight laser device as claimed in claim 9, wherein said sight contact is a movable body having an orifice, wherein said trigger is connected to a rod capable of moving under the action of said trigger transversely to the movement of said movable body and wherein the actuation of said trigger is possible only when said orifice is placed opposite said rod.

11. The optical .sight laser device as claimed in claim 9, wherein said device includes optoelectronic detectors activated in the respective positions of said trigger and of said sight contact.

12. The optical sight laser device as claimed in claim 5, wherein said sight system, said laser source, said movable means and said synchronization means are assembled into a single component.

13. The optical sight laser device as claimed in claim 12, wherein said component is supported by a block made of light alloy machined as a single piece.

* * * * *